(12) United States Patent
Sathe

(10) Patent No.: US 11,170,566 B2
(45) Date of Patent: Nov. 9, 2021

(54) MULTI-RATE SHADING USING REPLAYED SCREEN SPACE TILES

(71) Applicant: Nvidia Corporation, Santa Clara, CA (US)

(72) Inventor: Rahul Sathe, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 16/860,320

(22) Filed: Apr. 28, 2020

(65) Prior Publication Data

US 2020/0258294 A1 Aug. 13, 2020

Related U.S. Application Data

(63) Continuation of application No. 16/035,175, filed on Jul. 13, 2018, now Pat. No. 10,672,185.

(51) Int. Cl.
*G06T 1/60* (2006.01)
*G06T 15/83* (2011.01)
*G06T 15/00* (2011.01)
*G06T 15/20* (2011.01)

(52) U.S. Cl.
CPC ............... *G06T 15/83* (2013.01); *G06T 1/60* (2013.01); *G06T 15/005* (2013.01); *G06T 15/205* (2013.01)

(58) Field of Classification Search
CPC ....... G06T 1/60; G06T 15/005; G06T 15/205; G06T 15/503; G06T 15/80; G06T 15/83
See application file for complete search history.

(56) References Cited

U.S. PATENT DOCUMENTS

| 7,474,308 | B2 | 1/2009 | Deering |
| 8,199,146 | B2 | 6/2012 | Nystad et al. |
| 8,233,004 | B1 | 7/2012 | Molnar et al. |
| 9,710,881 | B2 | 7/2017 | Cerny |
| 9,767,602 | B2 | 9/2017 | Liktor et al. |
| 9,905,046 | B2 | 2/2018 | Janczak et al. |
| 2010/0001999 | A1 | 1/2010 | Everitt et al. |
| 2011/0254852 | A1 | 10/2011 | Howson |

(Continued)

FOREIGN PATENT DOCUMENTS

WO 2016000129 A1 1/2016

OTHER PUBLICATIONS

Bjorge, M., et al., "Efficient Rendering With Tile Local Storage," The 41st International Conference and Exhibition on Computer Graphics and Interactive Techniques, Siggraph 2014 Naturally Digital, Vancouver, 50 pages.

(Continued)

*Primary Examiner* — Diane M Wills

(57) ABSTRACT

One aspect of the disclosure provides a method for rendering an image. The method includes: placing primitives of the image in a screen space; binning the primitives into tiles of the screen space that the primitives touch; and rasterizing the tiles. The aforementioned rasterizing includes shading a subset of the primitives binned to one of the tiles over multiple passes at multiple shading rates, each of the shading rates is based at least on a frequency at which a color being shaded at each pass changes across the screen space, and the subset of the primitives are cached in an on-chip memory of a processor rendering the image between the passes.

20 Claims, 4 Drawing Sheets

(56) References Cited

U.S. PATENT DOCUMENTS

| | | |
|---|---|---|
| 2015/0022525 A1* | 1/2015 | Grenfell ................ G06T 15/005 345/427 |
| 2016/0148420 A1 | 5/2016 | Ha et al. |
| 2016/0171756 A1 | 6/2016 | Akenine-Moller et al. |
| 2016/0284119 A1* | 9/2016 | Surti ..................... G06T 15/005 |
| 2017/0069132 A1 | 3/2017 | Howson et al. |
| 2017/0148203 A1 | 5/2017 | Hakura et al. |
| 2017/0293995 A1 | 10/2017 | Saleh et al. |
| 2017/0316601 A1 | 11/2017 | Kakarlapudi et al. |

OTHER PUBLICATIONS

Liktor, G., et al., "Decoupled Deferred Shading for Hardware Rasterization," ACM, 2012, 8 Pages.

Merry, B. "Opengl Insights—Performance Tuning for Tile-Based Architectures," 2012, 14 pages.

Olsson, O., et al., "Tiled Shading-Preprint," Chalmers University of Technology, JGT 2011, 16 pages.

* cited by examiner

MULTI-RATE SHADING USING REPLAYED SCREEN SPACE TILES

CROSS-REFERENCE TO RELATED APPLICATION

This application is a continuation of U.S. patent application Ser. No. 16/035,175 filed on Jul. 13, 2018, and entitled "MULTI-RATE SHADING USING REPLAYED SCREEN SPACE TILES." The afore-mentioned parent application is commonly assigned with the current application and is incorporated herein by reference in its entirety.

TECHNICAL FIELD

The application is directed, in general, to graphics processing and, more specifically, to multi-rate shading.

BACKGROUND

Shader programs are written and executed either at pixel or sample rate (aka super sampling). Multi-sampling anti-aliasing (MSAA) seeks the healthy balance between the two and shades pixels once per primitive. As the depth-stencil tests and Ouput Merger (OM) operations are done at the sample rate, the resolve pass needs to filter the color by taking some weighted combination of samples. Often it is desirable to evaluate slowing changing colors of a screen space (e.g., ambient occlusion) at a lower rate than rapidly changing colors (e.g., diffuse or specular highlights) of the screen space.

SUMMARY

One aspect of the disclosure provides a method for rendering an image. The method includes: placing primitives of the image in a screen space; binning the primitives into tiles of the screen space that the primitives touch; and rasterizing the tiles. The aforementioned rasterizing includes shading a subset of the primitives binned to one of the tiles over multiple passes at multiple shading rates, each of the shading rates is based at least on a frequency at which a color being shaded at each pass changes across the screen space, and the subset of the primitives are cached in an on-chip memory of a processor rendering the image between the passes.

Another aspect provides a system for rendering an image. The system includes a processor configured to: place primitives of the image in a screen space; bin the primitives into tiles of the screen space that the primitives touch; and rasterize the tiles. A subset of the primitives binned to one of the tiles are shaded over multiple passes at multiple shading rates, each of the shading rates is based at least on a frequency at which a color being shaded at each pass changes across the screen space, and the subset of the primitives are cached in an on-chip memory of the processor between the passes.

BRIEF DESCRIPTION

Reference is now made to the following descriptions taken in conjunction with the accompanying drawings, in which.

DETAILED DESCRIPTION

Figure 1:
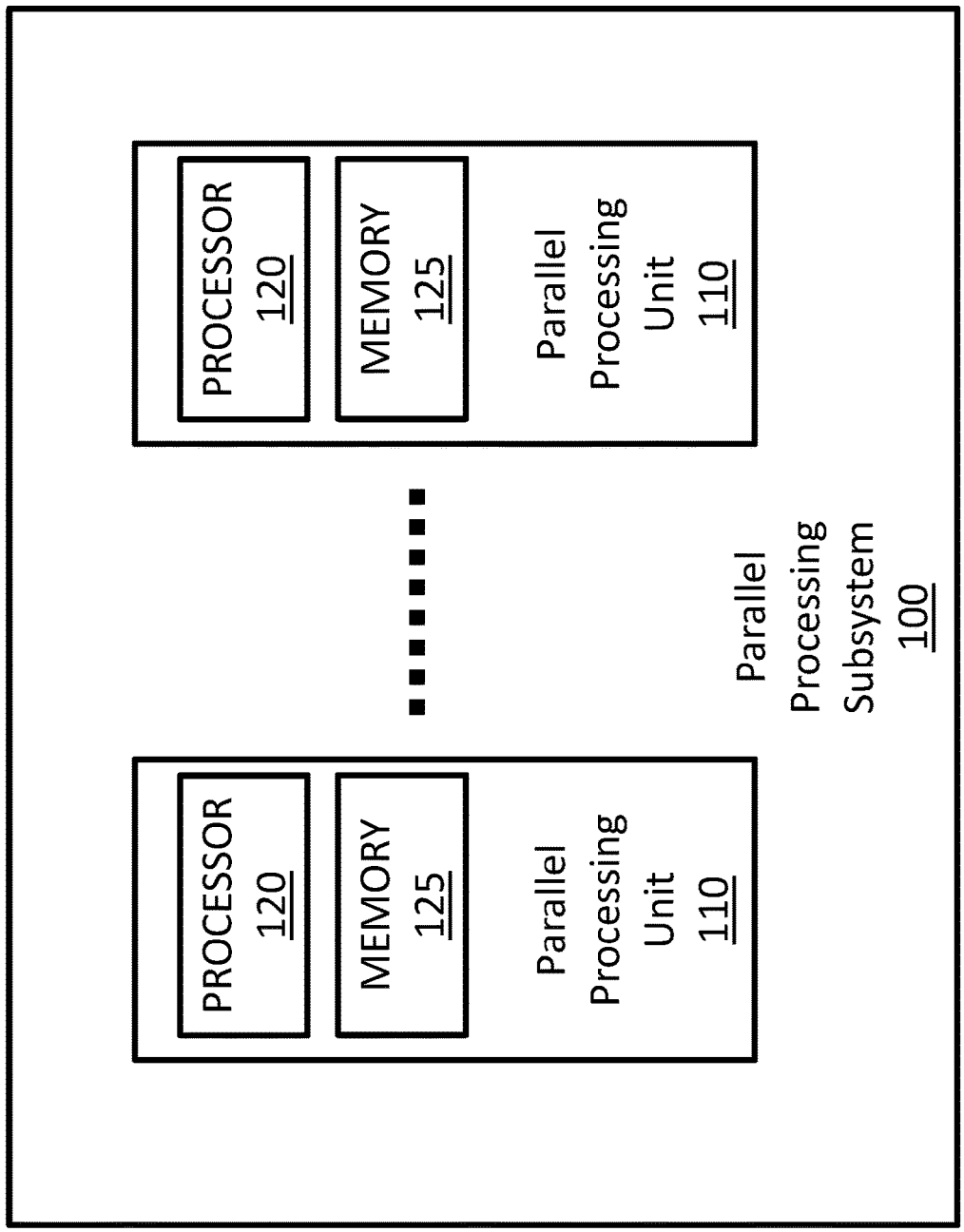
FIG. 1 is a block diagram illustrating a parallel processing subsystem configured to implement one or more aspects of the disclosure.

Rendering an image quite often involves rendering colors that change frequently across a screen space. Colors of screen space that change relatively slow across the screen space are called "slowly changing colors" or "slowly changing terms of rendering equation" and colors of screen space that change relatively fast across the screen space are called "rapidly changing colors" or "rapidly changing terms of rendering equation."

Conventionally, a screen space of an image is rendered at a fixed shading rate. Rendering the screen space at a relatively low fixed shading rate, such as MSAA can reduce the overall shading rate and thus the power and bandwidth consumption. It, however, may cause under-sampling in rapidly changing colors and negatively affect the quality of the rendered image. Naturally, rendering at a relatively fast fixed shading rate, e.g., super-sampling, can prevent under-sampling in rapidly changing colors but it may over-sample slowly changing colors.

The ideal solution involves shading slowly changing colors of a screen space at a low shading rate and shading rapidly changing colors of the screen space at a high shading rate. This can be achieved by performing multiple passes, using a different shading rate in each pass. But as primitives of the image have to be placed in the screen space before each pass, this increases the workload and negates the possible benefits that would be gained from multi-rate shading.

Introduced herein is an improved multi-rate shading method that shades colors of a screen space at multiple shading rates over multiple passes without placing primitives multiple times. Instead, using a bin replay feature of a processor, the introduced method caches the primitives placed during first shading pass in an on-chip memory of the processor and replays them in subsequent shading passes. Thus, the disclosure provides a novel way of achieving multi-rate shading by using the bin-replay feature introduced in the graphic architecture of NVIDIA Maxwell™.

In one embodiment, the introduced method first places all primitives of an image in a screen space and bins/groups the primitives into tiles they touch. The method then rasterizes the tiles at one tile at a time over multiple passes, e.g., shading primitives binned to each tile at a first shading rate over a first pass and shading the same primitives at a second shading rate over a second pass.

Unlike the current multi-rate shading where the primitives have to be processed, e.g., placed and binned, for each shading pass, the introduced method uses the bin replay feature to bring back the binned primitives from the previous pass. The first and second shading rates are different from one another to address colors with different frequencies, and the shading rates are based on the granularity/frequency of color(s) being shaded at each pass. For example, for a pass that shades slowly changing colors, e.g., slowly changing terms of the rendering equation, the method may use a relatively slow shading rate, e.g., MSAA, and for a pass that shades relatively rapidly changing colors, e.g., rapidly changing terms of the rendering equation, the method may use super sampling. As such, the method in this example would calculate low frequency components of the rendering equation using MSAA followed by high frequency components using super sampling without processing primitives multiple times.

It is understood that the terms "slowly changing color" and "rapidly changing color" are defined relative to one another such that any color in a screen space that changes more often over the screen space than the "slowly changing color" may be a "rapidly changing color" and any color in a screen space that changes less often over the screen space than the "slowly changing color" may be a "rapidly changing color" For example, the fastest changing color would be a color that changes once per sample and the slowest changing color would be a constant color that does not change. FIG. 1 is a block diagram illustrating a parallel processing subsystem (PPS) 100 configured to implement one or more aspects of the disclosure. The PPS 100 may be a discrete part of a computer system or integrated with other elements of a computer system to form a single system. In one embodiment, the PPS 100 may even be integrated with a CPU and other connection circuitry on a single chip to form a system on chip (SoC).

In the illustrated embodiment, the PPS 100 comprises one or more parallel processing units (PPU) 110. The PPUs 110 are configured to perform various operations including general purpose operation, compute operation, and/or graphics processing operation.

In the illustrated embodiment, the PPU 110 comprises a processor 120 and a local, on-chip memory 125. The processor 120 can be a graphics processing unit (GPU) configured to implement a graphics rendering pipeline to perform various operations related to generating pixel data based on graphics data supplied by a CPU and/or a system memory. When processing graphics data, the local memory 125 can be used as graphics memory that stores one or more conventional frame buffers and, if needed, one or more other render targets as well. Among other things, the memory 125 may be used to store and update pixel data and deliver final pixel data or display frames to a display device (not shown) for display.

Figure 2:
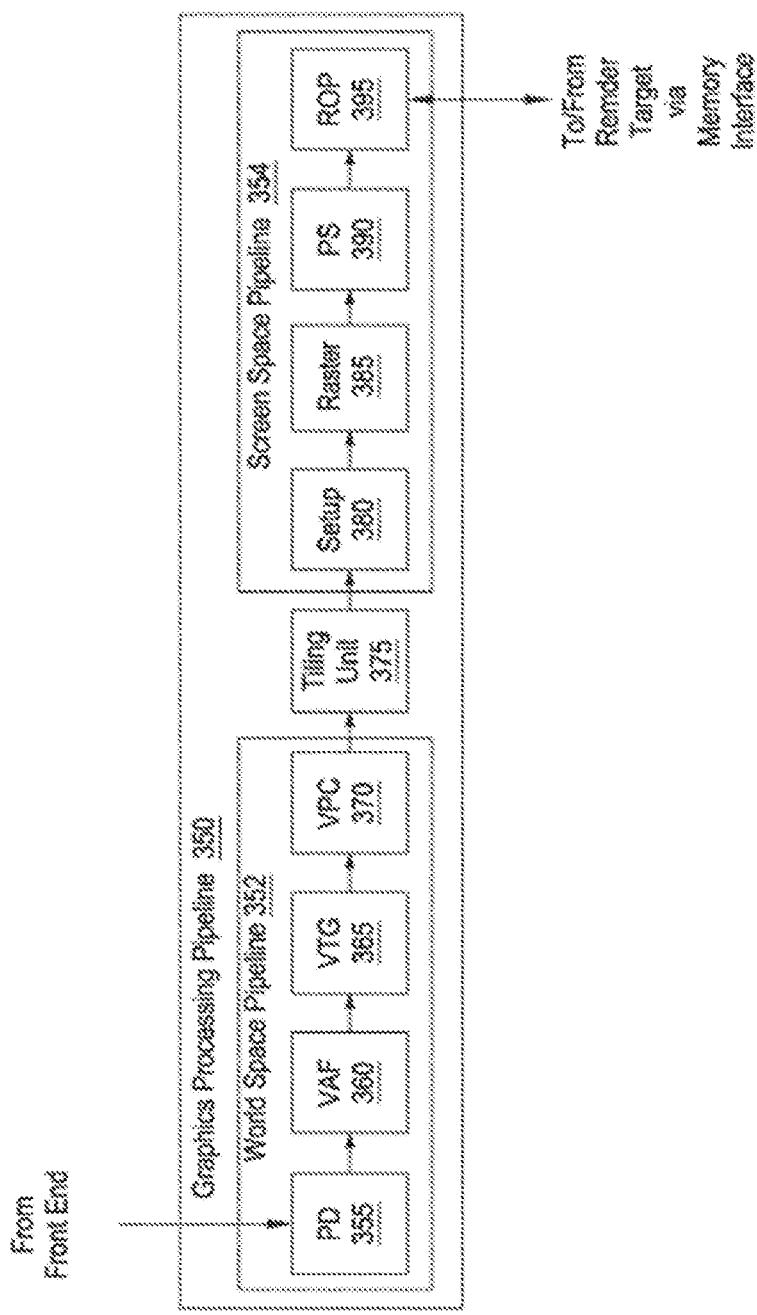
FIG. 2 is a conceptual illustration of a graphics processing pipeline configured to implement one or more aspects of the disclosure.

FIG. 2 is a conceptual illustration of a graphics processing pipeline 350 that may be implemented within a parallel processing unit according to one embodiment of the disclosure. The graphics processing pipeline 350 may be implemented by any one or more processing elements, such as one or more streaming multiprocessors within a PPU. Alternatively, the graphics processing pipeline 350 may be implemented using dedicated fixed-function processing elements. In some embodiments, a PPU may be configured to implement multiple graphics processing pipelines.

In the illustrated embodiment, the graphics processing pipeline 350 is divided into a world space pipeline 352 and a screen space pipeline 354 with a tiling unit 375 there between. The world space pipeline 352 processes graphics objects in 3D space, where the position of each graphics object is known relative to other graphics objects and relative to a 3D coordinate system. In the illustrated embodiment, the world space pipeline 352 includes a primitive distributor (PD) 355, a vertex attribute fetch unit (VAF) 360, a vertex, tessellation, geometry processing unit (VTG) 365, and a viewport scale, cull, and clip unit (VPC) 370.

The screen space pipeline 354 processes graphics objects that have been projected from the 3D coordinate system onto a 2D planar surface representing the surface of the display device. The screen space pipeline 354 includes a setup unit 380, a rasterizer (raster) 385, a fragment processing unit, also identified as a pixel shading unit (PS) 390, and a raster operations unit (ROP) 395.

The PD 355 collects vertex data associated with high-order surfaces, graphics primitives, and the like, from a front end of the PPU and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360, and produce graphics primitives, as well as color values, surface normal vectors, and transparency values at each vertex for the graphics primitives for further processing within the graphics processing pipeline 350. The VTG 365 transmits the parameters and vertices specifying new graphics primitives to the VPC 370.

The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between the world space pipeline 352 and the screen space pipeline 354. The screen space is divided into tiles, each tile representing each different portion of the screen space. For each graphics primitive, the tiling unit 375 identifies tiles that intersect/touch with the graphics primitive in a process referred to herein as "binning." After binning a certain number of graphics primitives, the tiling unit 375 processes the graphics primitives on a tile basis, where graphics primitives associated with a particular tile are transmitted to the setup unit 380. The tiling unit 375 transmits graphics primitives to the setup unit 380 one tile at a time. Graphics primitives that intersect with multiple tiles are typically processed once in the world space pipeline 352, but are then transmitted multiple times to the screen space pipeline 354.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to the rasterizer 385.

The rasterizer 385 converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity or at sample-level granularity when each pixel includes multiple samples. Alternatively, fragment shader programs may shade fragments at any other technically feasible granularity, depending on the programmed sampling rate such as in MSAA or super sampling.

In some embodiments, the pixel shading unit 390 may be programmed to perform operations such as perspective correction, texture mapping, shading, blending, and the like, to produce shaded fragments that are transmitted to the ROP 395.

The ROP 395 is a processing unit that performs raster operations, such as stencil, z test, blending, and the like, and transmits pixel data as processed graphics data for storage in graphics memory, which is typically structured as one or more render targets.

Figure 3:
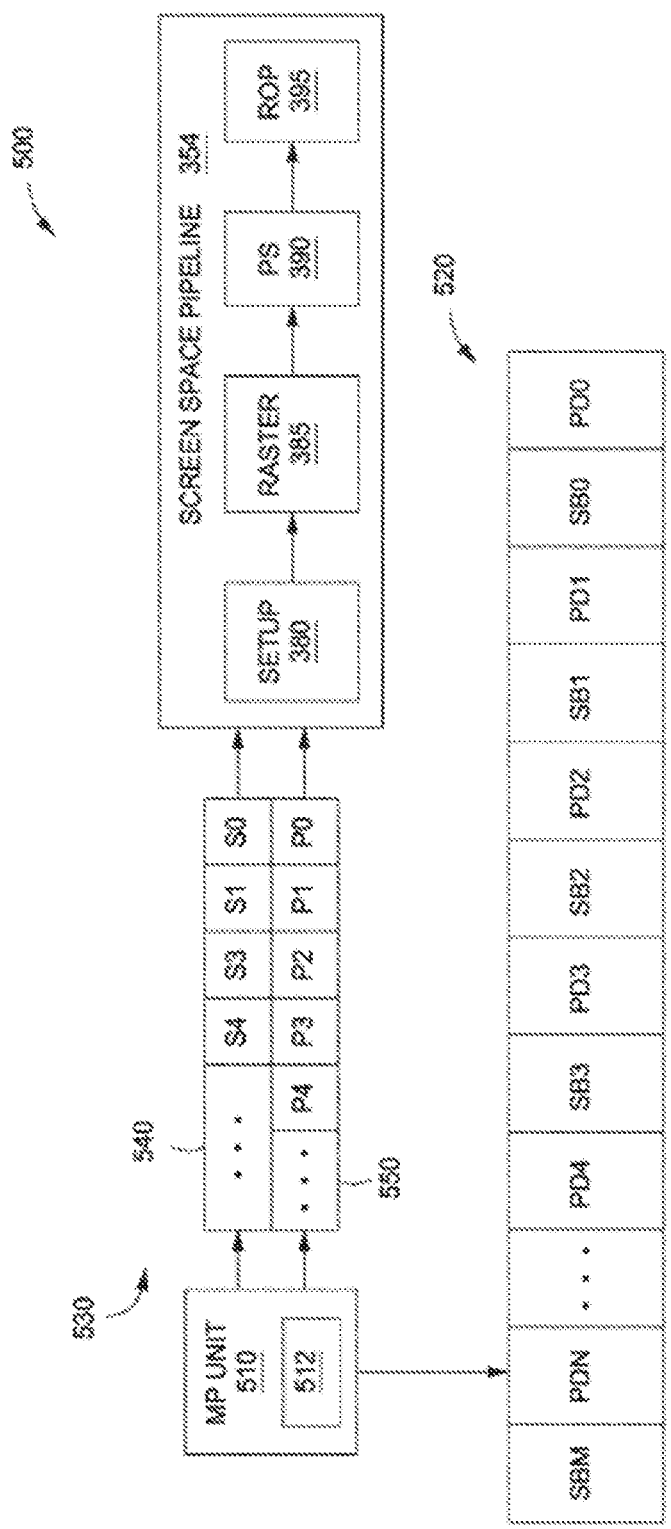
FIG. 3 illustrates a portion of a graphics processing pipeline configured to implement one or more aspects of the disclosure.

FIG. 3 illustrates an embodiment of a portion 500 of a graphics processing pipeline that is configured to replay and process primitive data in multiple passes. As illustrated, the portion 500 includes a multi-pass (MP) unit 510 that resides upstream of screen space pipeline 354. The MP unit 510 may reside within a tiling unit, such as the tiling unit 375 in FIG. 2.

The MP unit 510 is coupled to a buffer 520 that is configured to store primitive data and state bundles. The data stored in buffer 520 corresponds to one or more tiles. In one embodiment, the buffer 520 is a random access memory (RAM) unit. The buffer 520 may be a local, on-chip memory such as the local memory 125 in FIG. 1. The buffer 520 includes primitive data $PD_0$ through $PD_N$, as is shown. Each primitive data in the buffer 520 includes a graphics geometry or graphics geometry indices, and a primitive mask. The buffer 520 also includes state bundles $SB_0$ through $SB_M$, as shown. Each state bundle in buffer 520 includes one or more state settings, and a state mask.

The MP unit 510 is configured to perform one or more traversals of the buffer 520 to replay some or all of the primitive data stored therein during one or more corresponding passes through screen space pipeline. For each such pass, the MP unit 510 configures the screen space pipeline based on specific state bundles in the buffer 520. Thus, screen space pipeline may be configured differently for each different pass. In addition, for each different pass, the MP unit 510 may transmit different subsets of graphics primitives extracted from the buffer 520 to the screen space pipeline for processing.

The MP unit 510 includes a pass mask 512 that indicates the number of passes to be performed and the current pass number. The number of bits in pass mask 512 reflects the number of passes to be performed. Each bit of pass mask 512 corresponds to a different pass number. When traversing the buffer 520, the MP unit 510 relies on pass mask 512 to filter out primitive data and state bundles that are relevant to the current pass.

Each primitive data stored in the buffer 520, such as $PD_O$ or $PD_1$, includes a graphics primitive or graphics primitive indices, as well as a primitive mask, as mentioned above. The primitive mask indicates the particular passes through the screen space pipeline 354 during which the graphics primitive should be replayed. The primitive mask is generally of equal size to pass mask 512.

Each state bundle stored in the buffer 520, such as SB0 or SB1, includes one or more state settings, and a state mask, as also mentioned above. Each state setting generally reflects the configuration of a particular state of a screen space pipeline. Persons skilled in the art will understand that "state" is a broad term meant to capture a general configurable feature of a screen space pipeline, and that a "state setting" represents a specific configuration of that feature.

In operation, for a given pass through the screen space pipeline 354, the MP unit 510 generates pass data 530 that includes both state settings 540 that will be used to configure the screen space pipeline 354 for the current pass, and primitives 550 that will be processed during the current pass. The MP unit 510 may then configure the screen space pipeline 354 based on state settings 540, and then process the primitives 550 using the configured screen space pipeline 354. For subsequent passes, the MP unit 510 may perform an analogous operation. However, since pass mask 512 differs based on the current pass number, the specific state settings 540 and primitives 550 extracted from buffer 520 for the subsequent pass may differ compared to the previous pass. With this approach, the graphics processing pipeline 350 can process primitive data multiple times with different configurations of a screen space pipeline, without needing to fetch primitives from the graphics or system memory multiple times. Instead, the graphics processing pipeline 350 may fetch the primitives from the local buffer 520.

Using this approach, a pixel shading unit in a screen space pipeline may be configured to perform different types of shading operations depending on the current pass. For example, the MP unit 510 generates first pass data that for configuring the screen space pipeline 354 to perform one type of shading operation on the primitives for the first pass and a second pass data to perform other types of shading operation on the primitives for a second pass. Based on the state settings and primitives in these two pass data, the screen space pipeline 354 may be configured to shade the primitives using MSAA in one pass and shade the primitives using super-sampling in the other pass.

Figure 4:
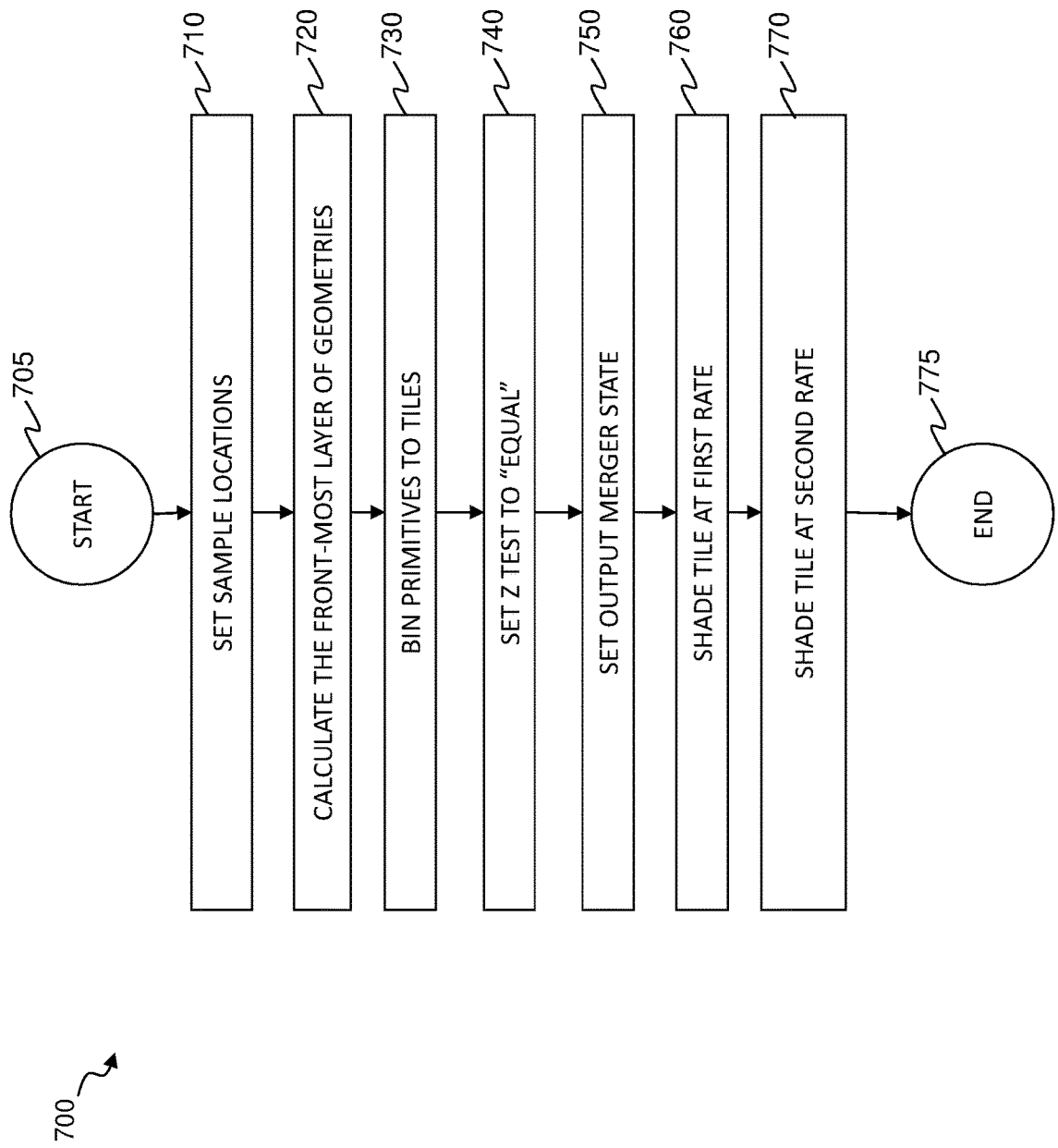
FIG. 4 is a flow diagram of an embodiment of a method for multi-rate shading according to one or more aspects of the disclosure.

FIG. 4 illustrates an embodiment of a method 700 for rendering an image with multi rate shading. The method 700 may be performed by a PPU, such as the PPU 110 in FIG. 1. In one embodiment, the method 700 is performed by a PPU in NVIDIA Maxwell™, Pascal™ and Turing™ architectures. The method 700 starts at step 705.

At step 710, sample locations of the image are set. As the sample locations are arranged in a rotated grid pattern by default, the step 710 changes the samples locations to be arranged in a regular grid. Unlike samples in the rotated grid pattern that are unevenly spaced, samples in the regular grid are evenly (uniformly) spaced apart from one another. In one embodiment, the step 710 is carried out by the PPU programmed with NVAPI.

At step 720, a z pre-pass is performed to determine the front-most layer of primitives of the image. This step is performed to avoid shading occluded pixels. The results of the z pre-pass are stored in a z buffer, which may be a local, on chip memory of a processor in the PPU.

Binning is enabled and performed at step 730. In the step 730, the primitives are placed in a screen space and binned to each portion, i.e., tiles, of the screen they touch. Placing the primitives can be based on parameters such as a view point of the camera, a camera angle, a camera distance (from the scene), a scale of the scene. In one embodiment, a tile may be a square shaped and consists of 64 pixels in each side.

When a primitive lands entirely in one tile, that primitive is binned to that one tile, i.e., added to a list of primitives to be processed by that one tile. But if primitive overlaps multiple tiles, then that primitive is binned to all the tile it touches, e.g., added to the lists of all the tiles that it touches. In one embodiment, the step 730 is performed by a tiling unit in a graphics processing pipeline, such as the tiling unit 375 in FIG. 2.

Z test for shading is set to "equal" at step 740. Using the z buffer, a shading unit can compare the depth value of the incoming layer with the depth value of the existing layer and shade only if the depth values are "equal." As such, this will allow only the primitives in the front most layer to be shaded.

At step 750, Output Merger (OM) state is set. The OM state is set based on opacity/transparency of the primitives. In the illustrated embodiment, an appropriate OM state is set for additive blending as the primitives are opaque. The additive blending allows the results of multi-rate shadings to be combined. The OM state may be set with the D3DAPI or a similar rendering API such as OpenGL or Vulkan. Once the OM state is set, the primitives are rasterized at one tile at a time. For transparent primitives, an appropriate OM state for "over" operator may be set.

The steps 730-750 illustrate a tiled mode rendering. In tiled mode rendering, tiles are rasterized at one tile at a time. This improves memory temporal locality over immediate mode rendering since processing primitives of one tile before another causes accesses to memories, such as "read (Z/stencil) test and modify" to Z/stencil buffer memory or "read modify write" to color buffer memory, for that one tile to happen closer in time. By allocating a finite sized on-chip memory such as the local memory 125 in FIG. 1, these temporally-close accesses can be kept on chip, saving a lot of bandwidth and power. As such, tiled mode rendering is popular in the power constrained environments like cell phones and tablets Differences between immediate mode rendering and tiled rendering can be summarized by the pseudo-code in Table 1.

TABLE 1

Differences between the immediate mode and tiled mode rendering.

```
for each draw in the scene {                    // Binning Phase
    for each primitive {                         for each draw in the scene {
        if (!VF-culled && !!BF-culled) {             for each primitive {
            for each tile in the primitive {         if (!VF-culled && !!BF-culled)
                // Rasterize the pixels                   BinGeometry( )
                // Z-stencil test                    }
                // Pixel Shade                   }
                // Output Merger (RMW)
            }                                   // Shading Phase
        }                                       for each tile {
    }                                               for each draw {
}                                                       for each primitive{
                                                            // Rasterize the pixels
                                                            // Z-stencil test
                                                            // Pixel Shade
                                                            // Output Merger (RMW)
                                                        }
                                                    }
                                                }
Immediate Mode Rendering                        Tiled Mode Rendering
```

In the illustrated embodiment, the tiles are shaded at one tile at a time. At step 760, all primitives binned for a given tile are shaded at a first shading rate over a first pass. The state bundles are used to configure the screen space pipeline to perform the shading at the first rate.

The step 760 binds a shader program that performs the shading at the first rate and writes the results to a multi-sampled render target. In the illustrated embodiment, a pixel shading unit may execute a shader program that shades at the first shading rate by invoking the shader program once per primitive per pixel (MSAA) over the first pass.

Before moving to the next tile or placing the remaining primitives that land in the same tile in the case of bin flush, the binned primitives are cached for a subsequent shading at a second rate. The binned primitives are stored in a buffer, such as the local, on chip memory of a GPU in the PPU.

At step 770, the primitives that have been shaded in the step 760 are shaded at a second shading rate over a second pass. Instead of placing the primitives in the screen space again, the illustrated method replays the binned primitives that are stored in the on-chip memory. The state bundles are used to configure the screen space pipeline to perform the shading at the second rate.

Similar to the step 760, the method 700 binds a shader program that performs the shading at the second rate over a second pass. In the illustrated embodiment, a pixel shading unit may execute a shader program that shades at the second shading rate by invoking the shader program once per primitive per sample per pixel (super sampling) over the second pass. For super sampling, the step 770 provides a sample identifier such as SV_SampleId to the shader program. The results of the shading are written to the same multi-sampled render target, to which the results of the step 760 have been written to.

The first and second shading rates are different from one another. The shading rates are based on the granularity of color being shaded at each pass. In the illustrated embodiment, the first pass is a pass that shades the relatively slowly changing colors in the tile, e.g., slowly changing terms of the rendering equation and the method 700 hence shades the tile at a relatively slow shading rate, e.g., MSAA. The second pass is a pass that shades the relatively fast changing colors in the tile, e.g., rapidly changing terms of the rendering equation and the method 700 accordingly uses super sampling.

It is understood that while the illustrated embodiment only has two passes, there may be more than two passes and each pass can have a different shading rate to shade colors of different frequencies of changes.

As a result, the shading is evaluated at each sample location and unique color is written out at those locations achieving the desired end-result of multi-rate shading. As the state of Output Merger has been set to additive blending, the results of the step 770 are added to the results of the step 760.

If the algorithm requires calculating some coefficients or terms that do not directly get added to the final rendering color, one can write such quantities to a render target different from the color in the first pass, e.g., step 760. During the second pass, the render target that stores the coefficients can be bound as a texture. Note that there is one-to-one mapping between pixels across the passes, i.e. the pixels that get written to in the first pass are the ones that get read back in the second pass, so such a resource state change should be safe across the replay passes. The method 700 ends at 775.

It is understood that the above described method 700 is ideal for shading opaque primitives of an image. For non-opaque primitives, the ordering of the binned primitives need to modified.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

The above-described apparatuses, systems or methods or at least a portion thereof may be embodied in or performed by various processors, such as digital data processors or computers, wherein the processors are programmed or store executable programs or sequences of software instructions to perform one or more of the steps of the methods or functions of the apparatuses or systems. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system described herein.

Certain embodiments disclosed herein or features thereof may further relate to computer storage products with a non-transitory computer-readable medium that has program code thereon for performing various computer-implemented operations that embody at least part of the apparatuses, the systems, or to carry out or direct at least some of the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

What is claimed is:

1. A method for rendering an image, comprising:
placing primitives of said image in a screen space;
binning said primitives into tiles of said screen space that said primitives touch; and
rasterizing said tiles;
wherein said rasterizing includes shading a subset of said primitives binned to one of said tiles over multiple passes at multiple shading rates, each of said shading rates is based at least on a frequency at which a color being shaded at each pass changes across said screen space, and said subset of said primitives are cached in an on-chip memory of a processor rendering said image between said passes.

2. The method of claim 1, wherein said shading includes invoking a first shader per primitive per pixel in one of said passes and invoking a second shader per primitive per sample per pixel in another one of said passes.

3. The method of claim 1, further comprising bringing back said subset set of said primitives that are cached in said on-chip memory for a current pass.

4. The method of claim 1, wherein said placing is performed once while said image is rendered.

5. The method of claim 1, wherein said binning said primitives includes:
if one primitive of said primitives lands entirely in a particular tile of said tiles, binning said one primitive to said particular tile; and
if said one primitive overlaps multiple tiles of said tiles, binning said one primitive to all of said multiple tiles.

6. The method of claim 1, further comprising evaluating said shading at each sample location.

7. The method of claim 1, further comprising determining the front-most layer of said primitives of said image by comparing depth values of a current layer of said primitives with depth values of an existing layer of said primitives.

8. The method of claim 1, further comprising calculating a color for each sample by using shaded values from said passes.

9. The method of claim 8, wherein said shaded values are combined when said subset of said primitives are opaque.

10. The method of claim 1, wherein said tiles are rasterized at one tile at a time.

11. A system for rendering an image, comprising:
a processor configured to:
place primitives of said image in a screen space;
bin said primitives into tiles of said screen space that said primitives touch; and
rasterize said tiles;
wherein a subset of said primitives binned to one of said tiles are shaded over multiple passes at multiple shading rates, each of said shading rates is based at least on a frequency at which a color being shaded at each pass changes across said screen space, and said subset of said primitives are cached in an on-chip memory of said processor between said passes.

12. The system of claim 11, wherein said primitives are placed in said screen space once while said image is rendered.

13. The system of claim 11, wherein said multiple shading rates include a first shading rate generated by invoking a first shader per primitive per pixel in one of said passes, and a second shading rate generated by invoking a second shader per primitive per sample per pixel in another one of said passes.

14. The system of claim 11, wherein said processor is further configured to bring back said subset of said primitives that are cached in said on-chip memory for a current pass.

15. The system of claim 11, wherein said tiles are square-shaped and include 64 pixels in each side.

16. The system of claim 11, wherein if one primitive of said primitives lands entirely in a particular tile of said tiles, said one primitive is binned to said particular tile, and if said one primitive overlaps multiple tiles of said tiles, said one primitive is binned to all of said multiple tiles.

17. The system of claim 11, wherein said subset of said primitives are shaded by a graphics processing pipeline implemented by said processor.

18. The system of claim 11, wherein said processor is further configured to determine the front-most layer of said primitives of said image by comparing depth values of a current layer of said primitives with depth values of an existing layer of said primitives.

19. The system of claim 11, wherein said processor is further configured to calculate a color for each sample by combining shaded values from said passes using an additive blending.

20. The system of claim 11, wherein said tiles are rasterized at one tile at a time.

* * * * *